United States Patent [19]
Radici et al.

[11] 4,003,960
[45] Jan. 18, 1977

[54] BLOCK COPOLYMERS

[75] Inventors: Pierino Radici, Turate (Como); Gaudenzio Bianchi, Fagnano Olona (Varese); Daniele Colombo, Castellanza (Varese); Paolo Colombo, Saronno (Varese), all of Italy

[73] Assignee: Societa'Italiana Resine S.I.R. S.p.A., Milan, Italy

[22] Filed: Dec. 22, 1975

[21] Appl. No.: 642,810

[30] Foreign Application Priority Data
Dec. 20, 1974 Italy .................. 30830/74

[52] U.S. Cl. .................. 260/857 F; 260/67 FP
[51] Int. Cl.² .................. C08L 77/00
[58] Field of Search .................. 260/857 F

[56] References Cited
UNITED STATES PATENTS

| | | | |
|---|---|---|---|
| 2,993,025 | 7/1961 | Alsup | 260/857 F |
| 3,204,012 | 8/1965 | Eguchi | 260/857 F |
| 3,235,624 | 2/1966 | Green | 260/857 F |
| 3,288,885 | 11/1966 | Green | 260/857 F |

Primary Examiner—Paul Lieberman
Attorney, Agent, or Firm—Sughrue, Rothwell, Mion, Zinn & Macpeak

[57] ABSTRACT

Block copolymer of the structure A-B, wherein:

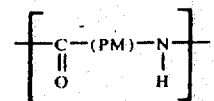

A is a polylactamic block of recurring units: t,0010
wherein PM is a linear polymethylene chain having from 3 to 13 carbon atoms,
B is a polyoxymethylene block of recurring units [CH₂O]. The block copolymer contains at least 2 wt.% of block B and at least 0.05 wt.% of block A.

The block copolymer can be used as technopolymer when rich in block B, or in the field of yarns and molded products when rich in block A.

12 Claims, No Drawings

BLOCK COPOLYMERS

This invention relates to a new block copolymer and a method for the manufacture thereof.

One object of this invention consists of providing a new block copolymer which consists of one polylactam block and one polyoxymethylene block chemically bonded together.

Another object of this invention consists of a method for the preparation of this block copolymer.

Thus, the invention provides a block copolymer of the structure A-B wherein:

A is a polylactamic block consisting of a chain of recurring units:

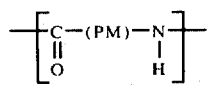

obtainable from one or more monomeric lactams of the formula:

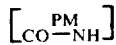

wherein PM is a linear polymethylene chain having from 3 to 13 carbon atoms, non substituted or having at least one hydrogen atom replaced by a radical selected in the group consisting of the alkyl, aryl, alkylaryl and cycloalkyl radicals, B is a polyoxymethylene block consisting of recurring units $+CH_2-O+$, the said block B being present in the copolymer in an amount of at least 2% by weight and the said block A being present in the copolymer in an amount of at least 0.05% by weight.

Among the lactams, those preferred for the purposes of this invention are: α-pyrrolidone, α-piperidone, ω-enantiolactam, ε-caprolactam and ω-lauryllactam.

Thus, the copolymer of the invention comprises two homogeneous blocks bonded together by a chemical covalent type bond.

The block copolymer of the invention is preferably used when the block A has a molecular weight of from 1000 to 50,000.

The uses of the A-B copolymer depend mainly on its composition. Thus, the copolymer rich in block A is particularly useful in the field of yarns and moulded products, whilst the copolymer rich in block B is particularly useful as technopolymer for special applications.

The block copolymer of the invention is prepared by a method which essentially consists of:

preparing the polymer A by catalytic polymerization of one or more of the aforesaid lactam monomers in a first polymerization stage;

purifying the polymer A to render it suitable for the subsequent reaction with formaldehyde;

preparing the A-B copolymer in a second polymerization stage by reacting monomeric formaldehyde with the A polymer.

Moreover, according to a preferred embodiment of the process of this invention, the resulting A-B copolymer is stabilized by converting the unstable terminal hydroxyl group of the block B into a stable group.

PREPARATION OF THE POLYMER A

According to this invention the polymer A, consisting of one polylactamic block, is first prepared, by polymerization of the said lactam monomer or monomers. The said polymerization is usually carried out in the presence of an anionic catalyst consisting generally of a derivative of a lactam of the following general formula:

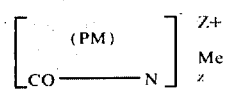

wherein Me is an alkali or alkaline-earth metal or a substituted quaternary ammonium group, Z is 1 or 2 and PM is the polyoxymethylene chain previously defined. Amongst the alkali metals, those preferred are: lithium, sodium and potassium, whilst amongst the alkaline-earth metals, calcium is preferred. In the case of the ammonium group the hydrogen atoms are replaced by alkyl, cycloalkyl, aryl, aryl or alkylated aryl groups.

Preformed catalyst can be added to the polymerization medium, or else said catalyst can be formed in situ, by reaction between the lactam and Me or one of its derivatives.

Anionic polymerization of the lactams is also preferably carried out in the presence of an activator other than the catalyst mentioned.

The presence of these substances, also known as co-catalysts or promoters, makes it possible to use milder polymerization conditions, with reduction or elimination of secondary reactions, to decrease the initial induction time, and to obtain a polymer of more controlled molecular weight. The mechanism of polymerization is referrable to the known anionic polymerization of lactams.

Examples of co-catalysts or promoters are: N-acyllactams such as N-acetyl lactams, acid chlorides; N-substituted imides, or esters of organic acids such as ethyl acetate; isocyanates such as phenyl isocyanate etc.

GENERAL REACTION CONDITIONS FOR PREPARATION OF THE POLYMER A

The polymerization temperature of the lactams may vary within a very wide range, in general from −30° to +300° C, the best suited temperature being selected according to the type of polymer to be obtained and to the intended purposes (type of monomer or monomers and their ratio).

The polymerization period can vary from 1 minute to 120 hours. In any case, an amount of catalyst of from 0.1 to 10 moles to each 100 moles of lactam monomer charge is conveniently used and an amount of activator of from 0.1 to 10 moles per 100 moles of the said lactam monomer charge is also generally used.

Polymerization is preferably carried out in an absolutely inert atmosphere with pure monomers, above all free from moisture and compounds with active hydrogen ions. The polymerization can be carried out in suspension in a diluent (non-solvent for the forming polymer), in solution in a solvent for the forming polymer, or in the absence of solvent and diluent.

POLYMERIZATION IN THE ABSENCE OF SOLVENT OR DILUENT

In the first polymerization stage carried out in the absence of solvents or diluents (i.e., in bulk or in a molten state), reaction conditions are adjusted in dependence on the monomer, the particular catalyst and activator, as well as the intended uses. The polymerization temperature may vary in a very wide range of values, and more precisely from −30° C to 300° C.

The polymerization period can vary, generally, from 1 minute to 120 hours, according to the type of monomer, catalyst and activator and their ratios. Usually this period is from 5 minutes to 40 hours.

It is possible to operate either at a temperature above or below the melting point of the polymer, for some monomers, whilst for others it is only possible to operate under more restricted conditions.

For example, in the case of ε-caprolactam it is possible to operate at 230° C, for a time of 15 minutes using about 0.5 moles of lithium-lactam catalyst for every 100 moles of lactam.

In this manner, one obtains a 94% conversion and a polymer A (melting point 215° C) with a reduced viscosity of 3.2. In the following, the A polymer viscosity will be always measured at 35° C from a solution of m-cresol containing 0.5 wt.% of polymer A and expressed as the ratio $$\eta \text{ reduced} = \frac{\eta \text{ specific}}{\text{concentration}} \text{ in liters} \cdot g^{-1}.$$

Similarly, operating at 140° C, using lithium-lactam catalyst in an amount of 1 mole per 100 moles of lactam monomer and acetyl-lactam also in an amount of 1 mole per 100 moles of lactam monomer, one obtains, a polymer A with a reduced viscosity equal to 1.5, in 40 minutes with a 96% conversion.

Polymerization of α-pyrrolidone is usually carried out at a temperature below 100° C. For example the polymer is obtained, with a reduced viscosity equal to 2.5, and with a conversion of 88.5% in a period of 24 hours by operating at 25° C, using as a catalyst tetramethyl-ammonium lactam in an amount of 2 moles per 100 moles of δ-pyrrolidone and as activator N-acetylpyrrolidone in an amount of 2 moles per 100 moles of α-pyrrolidone.

A copolymer based on α-pyrrolidone and ε-caprolactam, in a molar ratio of 7:3 is produced at 70° C, in bulk, using potassium-caprolactam as a catalyst and N-N-diphenyl-carbamyl-caprolactam as an activator. Finally by polymerizing lauryllactam at 250° C for a period of 40 minutes using sodium-lactam as a catalyst and N-benzoyl-lactam as an activator, each in an amount of 2 moles for 100 moles of lactam, a polymer A (melting point 176°–180° C) having a reduced viscosity of 1.25 is produced with a conversion of 89.5%.

POLYMERIZATION IN SUSPENSION

In polymerization by the suspension method, the reaction conditions vary also according to the type of monomer, the pre-selected catalyst, and also the type of diluent used. It is possible to use as a diluent any liquid substance which does not dissolve the polymer at the polymerization temperature, and which is inert towards the other substances present in the reaction medium. Generally, diluents consist of organic substances such as aromatic, aliphatic, or cycloaliphatic hydrocarbons, or else of aprotic polar solvents such as substituted amides, dialkylsulphoxides and dialkylphosphoramides.

The reaction temperature may vary within a wide range such as from −30° to 300° C. Preferably the temperature should be kept lower than the melting point of the forming polymer, since if the product melts the use of a special type of agitator is necessary. The reaction time may vary from 5 minutes to 120 hours, preferably from 30 minutes to 50 hours. In any case, in polymerization in suspension, the temperature is regulated so as to avoid dissolution phenomena of the polymer in the diluent being used. This obviously applies in the case of the use of polar solvents.

In suspension polymerization of α-piperidone in toluene at 40° C, using tetramethylammonium piperidone as catalyst and N-acetyl piperidone as promotor a polymer A having a reduced viscosity of 1.82 is produced in a period of 80 hours, with a conversion of 70%.

In suspension polymerization of α-pyrrolidone in dimethyl-formamide at 0° C, using potassium-lactam as a catalyst and N-acetyl-pyrrolidone as an activator, both in amounts of one mole per 100 moles of pyrrolidone, a polymer A with a reduced viscosity of 1.91 is produced in a period of 80 hours, with a conversion of 94%.

POLYMERIZATION IN SOLUTION

In polymerization in solution the choice of the solvent is obviously bound up with the particular polymer to be produced, however, the choice is clearly very limited in the sense that inert compounds act usually as solvents at high temperatures. The polymerization temperature can sometimes be greater than the highest temperature of homopolymerization of the monomer (e.g., for α-pyrrolidone: 103° C).

By polymerization of ε-caprolactam in solution in dimethyl-sulphoxide, at 160° C, catalyzed by sodium-lactam and activated by amyl acetate, added both in an amount of 2 moles per 100 moles of lactam, a polymer A having a reduced viscosity of 0.65 is produced in a period of 4 hours with a conversion of 90.2%.

By copolymerization of ε-caprolactam and α-pyrrolidone in solution in dimethyl-formamide, at 150° C, catalyzed by potassium-caprolactam and activated by N-N-diphenylcarbamyl caprolactam, a polymer A composed of 10% of α-pyrrolidone and 90% of ε-caprolactam is produced with 85.4% yield. The said polymer A has a melting point of 207°–210° C and a reduced viscosity of 2.0.

Sometimes it is possible to use mixtures of the solvent proper with aliphatic or aromatic liquids such that the liquid mixture is still a solvent at the temperature of polymerization. The reaction temperature is usually of from 20° C to 200° C and the reaction period is usually of from 30 minutes to 120 hours.

Preparation of polymer A, other than in solution, in suspension, or without solvent, can also be brought about by using a mixed polymerization. For example, the passage from the solution polymerization to the suspension polymerization can occur through lowering of temperature during the course of reaction or else by adding to the reaction medium a non-solvent for the polymer A.

TREATMENT OF THE POLYMER A

The polymer A, prepared according to the methods described, has to be subjected to a treatment which renders it suitable for the subsequent reaction with formaldehyde.

The said treatments consist essentially in purifying the polymer A containing the catalytically active nuclei in the macromolecular chain.

Preferably, the polymer A is brought to a particulate form during or possibly before said purification treatment, inasmuch as the said polymer A is then in a physical form suitable for its subsequent reaction with formaldehyde.

More particularly the polymer A, produced by the previously described methods, is purified in order to remove the unreacted monomers, the free catalytic residues and any other possible impurities.

Special care has to be given to the elimination of the free catalytic residues, since they would give rise to the formation of formaldehyde homopolymers in the second polymerization stage.

Purification can be effected by dissolving the polymer A in a solvent, followed by precipitation and washing of the said polymer A.

The solvents suitable for such a treatment are those in which the impurities are highly soluble and which do not destroy the catalytically active centres bonded to the macromolecular chain.

More particularly the solvents belong to the following general classes: chlorinated aliphatic hydrocarbons, chlorinated aromatic hydrocarbons, aromatic nitro derivatives, amides, sulphoxides and others. Examples of such solvents are: nitrobenzene, chlorobenzene, dimethyl formamide, dimethyl sulphoxide, dimethyl acetamide and hexamethylphosphoric triamide.

According to one embodiment of the method of this invention the polymer A is dissolved in the solvent at a temperature of from 20° to 200° C. Then precipitation of the polymer A is induced by cooling the solution and/or by adding a non-solvent for the polymer A.

The non-solvents especially suitable for the purpose are the aliphatic or aromatic hydrocarbons such, for example, as hexane, heptane, octane, benzene, toluene, xylene etc.

The polymer A is then filtered and washed by means of the solvents described above, until the impurities are no longer present in the filtrate. These latter operations can be carried out at ambient temperature or even at higher temperatures.

The polymer A can be used in the second polymerization stage in solution or else, preferably, in suspension in a diluent.

In this latter case the polymer A should be in an extremely subdivided physical form in order to promote contact of its active centres with the formaldehyde.

For this reason, when the polymer A forms a precipitate, the conditions are advantageously so adjusted as to precipitate the polymer A in the form of particles of restricted size, for example, from 1 to 100 micron.

The particular treatment under discussion may have special aspects depending on whether the polymer A has been obtained by polymerization in solution, in suspension or without diluents or solvents. Thus, for example, in the case of polymerization in bulk or in molten state, the polymer A is conveniently pulverized and dissolved in a suitable solvent. In the case of a polymerization in the molten state it is also possible to add the solvent to the molten polymer or else to extrude the melt into the solvent. The precipitation and washing of the polymer A is then carried out. These latter steps can be repeated several times.

The suspension method is generally carried out so as to obtain the polymer A in a physical form suitable for the subsequent second polymerization stage. Sometimes it may be sufficient to filter the suspension and wash the solid thoroughly to separate the unwanted impurities.

The polymer A produced by the solution method is usually precipitated by cooling and/or by the addition of a non-solvent for the said polymer A. Filtering and washing then follow.

It will be clear from the above discussion that it is preferable to polymerize in the first stage by the suspension or solution method, since the impurities remain at least in part soluble in the diluent or the solvent. Therefore sometimes it is not necessary to redissolve the polymer A in a solvent and/or to precipitate it. In this case, it is preferable to carry out the first polymerization stage by the suspension method, since the polymer A is in a finely subdivided form suitable for the subsequent reaction with formaldehyde.

PREPARATION OF THE A - B COPOLYMER

According to the method of this invention, the polymer A prepared by the treatment previously described, is placed in contact with monomeric formaldehyde in a second polymerization stage in order to form the A - B copolymer.

To this end, the polymer A in powder form or dissolved in a solvent, or suspended in a diluent, is placed in contact with gaseous formaldehyde or else with a solution of formaldehyde in an organic solvent.

Solvents suitable for the polymer A are those previously described, whilst as diluents there can be used organic compounds belonging to the following general classes: aromatic hydrocarbons, aliphatic hydrocarbons, cycloaliphatic hydrocarbons, ethers and others. Examples of such diluents are: heptane, toluene, cyclohexane and diethyl ether.

In any case the said solvent or diluent should not interfere with the active centres of the polymer A and should be inert (non reactive) towards the other constituents of the reaction medium.

In the second polymerization stage the reaction can be carried out in a very wide range of temperature such as, for example, from −70° C to 110° C, although the reaction should preferably be carried out at from −20° C to 80° C.

The formaldehyde which is used should be extremely pure and anhydrous. A formaldehyde suitable for the purpose can, for example, be produced by the purification processes described in the U.S. Pat. Nos. 3,118,747 and 3,184,900.

In the second polymerization stage the order of addition of the regents is not important. Thus, for example, one can add the polymer A in solution or suspension to a solution of formaldehyde in an organic solvent.

It is also possible to add simultaneously, into a reaction medium the solution or suspension of the polymer A and the formaldehyde, either in gaseous form or in solution.

In a preferred embodiment, gaseous formaldehyde is fed to the solution or the suspension of the polymer A in a continuous process. This can be achieved by feeding the formaldehyde and the polymer A continuously into a reactor provided with stirring means, for example, according to the polymerization method described in U.S. Pat. No. 3,458,479 relating to the formation of the homopolymers of formaldehyde.

The amount of formaldehyde which is fed depends upon the size of the block B to be grafted on the polymer A, also taking into account the fact that, under the conditions described, practically total polymerization of the added formaldehyde is achieved.

In each case there is produced, at the end of the second polymerization stage, a suspension of the copolymer A - B.

A particular characteristic of the method according to the present invention consists in the production of a very fluid suspension of the copolymer A - B, even at a high concentration of the latter in the suspension.

The A - B copolymer thus produced is subjected to purifying treatments essentially intended to remove possible unaltered polymer A and the catalytically active centres.

To this end, the suspension of A-B copolymer is filtered and the solid is washed. More particularly solvents of the aforementioned type suitable for dissolving the unaltered polymer A are used.

Decomposition and elimination of the catalytically active centres is carried out with protic polar solvents such, for example, as alcohols or weak organic acids.

These treatments can be carried out at ambient temperature or at higher temperatures, such as up to 100° C. The A - B copolymer is finally dried, generally at a temperature of from 20° to 60° C, at atmospheric or subatmospheric pressure.

Thus the copolymer A - B is recovered in the form of a compact homogeneous powder, with a high apparent density, generally of the order of 0.5 – 0.8 kg/l.

STABILIZATION OF THE A - B COPOLYMER

The A - B copolymer of the present invention has a block B which carries a thermally unstable terminal hydroxyl group.

It is therefore expedient to transform this terminal hydroxyl group into a more stable group such, for example, as an ester, ether or urethane group.

To this end the A - B copolymer can be brought into contact with a reagent such as an anhydride of carboxylic acid (generally acetic anhydride) for the esterification, or else with an orthoester, epoxide or acetal for etherification, or else with a substance containing isocyanate or isothiocyanate groups for transformation into urethane or thiourethane groups.

In this stage, the procedure is similar to that known for blocking the unstable hydroxyl groups of the polyoxymethylenes.

Thus one can, for example, contact the reagent with the A - B copolymer either dissolved or suspended in a liquid reaction medium.

In a preferred embodiment the A - B copolymer is suspended in a liquid reaction medium consisting of a substance which is non-solvent for the latter, the said solvent and non-solvent substances being wholly miscible at the reaction temperature, but immiscible or only slightly miscible at temperatures lower than the reaction temperature, e.g. at ambient temperature. A method of this type was described in the Italian patent application No. 32,947 of 27.12.1971, now Italian Pat. No. 946,165.

It is also possible to work without solvents or diluents, by bringing the liquid or gaseous reagent into contact with the solid A - B copolymer.

In each case, in stabilizing the block copolymer, one operates within a temperature range of 60° to 200° C (preferably from 120° to 170° C) and for period of from 1 to 120 minutes.

The solvent or diluent substances useful for the purpose can be chosen from the following classes of compounds: aliphatic hydrocarbons, aromatic hydrocarbons, sulphoxides, ethers, ketones, esters and others.

A catalyst of the type used in the art for stabilizing polyoxymethylenes, can be used in the stabilizing reaction.

THE A - B COPOLYMER

As previously stated, the block copolymer of this invention has the structure: A - B, where A constitutes the polylactamic block, and B the polyoxymethylene block.

This structure is justified both by considerations related to the reaction mechanism, and also by analytical measurements.

More particularly, as far as considerations of the reaction mechanism are concerned, it is known that, in the polymerization reaction of one or more lactam monomers in the presence of an anionic catalyst, at the end of the reaction, the raw polymer A has an ionic couple on the terminal group of the chain. In fact there are numerous studies on these subjects, such as those appearing in Makromolekulare Chemie 115 (1968) pp. 33–42; 127 (1969) pp. 34–53; 89 (1965) pp. 27–43; in Fortschritte Der Hochpolymeren-Forschung 2 (1961) pp. 578–595; in Lupac (1972) (Helsinki) — Preprint 1, pp. 227–232.

This ionic couple originates polymerization of the formaldehyde with production of the A - B copolymer.

Production of the A-B copolymer is made possible by the use of solvents, diluents and reagents of especial purity so as to achieve conditions typical of the growth of living polymers.

In addition to the above considerations the composition of the A - B copolymer of the present invention is confirmed by the following analytical tests:

elementary analysis (carbon, hydrogen and nitrogen) confirmed the reaction and extraction balances;

the presence of the A and B blocks is determined by gas chromatographic pyrolitic analysis;

in the infra-red analysis of the non-stabilized A - B copolymer the presence is noted of the NH vibration band at 3310 cm$^{-1}$, of the OH vibration band at 3420 cm$^{-1}$, of the lactamic CO band at 1640 cm$^{-1}$, and of a band at 1660 – 1670 cm$^{-1}$, attributable to the vibration of the lactamic CO displaced upon substitution on the nitrogen;

the presence of A and B units was confirmed by nuclear magnetic resonance analysis.

The infra-red analysis of the A - B copolymer stabilized by means of acetylation of the terminal hydroxyl groups shows disappearance of the OH band and appearance of the CO of the acetic ester.

The physical, mechanical, optical, electrical and applicative characteristics of the A - B copolymers of this invention depend upon their composition and upon the molecular weight, as well as upon the particular monomers selected. It is not therefore possible to define a single group of properties; however it is possible to give indicative values for each homogeneous composition interval.

In Table 1 there are recorded under 1 the characteristics determined on samples of A-B copolymer of ε-caprolactam and formaldehyde, containing from 60 to 98% by weight of block A.

In the same Table, under 2, there are given the same characteristics determined on samples of polycaprolactam. A general improvement in the characteristics is noted in the case of the A - B copolymer, especially regarding the lower absorption of moisture (and hence better dimensional stability) and improved self-lubricating characteristics.

Physical mixtures of polyformaldehyde and polylactam are only possible with limited contents of the latter.

In Table 1, under 3, there are given the characteristics determined on samples of A - B copolymer of ε-caprolactam and formaldehyde, containing from 60 to 99.95% by weight of formaldehyde.

In Table 1, under 4, there are given the same characteristics determined on samples of acetylated polyformaldehyde.

With regard to the acetylated polyformaldehyde, the A - B copolymer shows improved mechanical characteristics (e.g. resiliance), dyeing aptitude (especially useful in the case of fibers), chemical and thermal stability, coating and self-extinguishing properties.

Therefore the A - B copolymer, with composition within the said limits, may be considered as modified polyacetal resins having improved characteristics.

The tests summarized in Table 1 were carried out conventionally according to the ASTM methods.

Analysis of the polymer A shows the following results:

Conversion of the monomer: 79.4%
Reduced viscosity: 0.80
Melting point: 215°–218° C
Particle size
> 88 microns = 0.5%
88 – 44 microns = 34.5%
< 44 microns = 65.0%

The suspension of the polymer A in toluene stored in an inert atmosphere is now ready for the subsequent reaction with formaldehyde.

Preparation of the A-B copolymer

Pure gaseous formaldehyde monomer is introduced at a rate of 2.5 parts per minute into a polymerization reactor containing 1000 parts of toluene and having a vigorous stirrer. Rigourously controlled conditions in respect of the absence of humidity and of air are maintained in the reactor by means of a suitable device with a flow of nitrogen. Before starting the addition of formaldehyde there are introduced into the reactor 4.0 parts of polymer A in suspension in toluene. The reactor is immersed in a water bath so as to maintain an inner temperature of 20°–25° C. The gaseous formaldehyde feed is continued for 100 minutes. Absorption and polymerization of formaldehyde are extremely rapid, practically no unaltered monomer issuing from the reactor. Finally the flow of the formaldehyde is switched and the polymer slurry is kept under stirring

TABLE 1

|  | 1 | 2 | 3 | 4 |
|---|---|---|---|---|
| Tensile strength: kg/sq.cm | 680–750 | 750 | 500–770 | 720 |
| Elongation: % | 70–200 | 200 | 70–120 | 60 |
| Impact strength Izod with notch Kg.cm/sq.cm | 12–20 | 20 | 14–20 | 12 |
| Density: g/ml | 1.13–1.24 | 1.12 | 1.30–1.42 | 1.42 |
| Coefficient of linear expansion: m/m $10^{-5}$ ° C | 9 | 12 | — | — |
| Moisture absorption % by weight | 1.17 | 1.6 | — | — |
| Flammability: mm/min. | — | — | 10–25 | 25 |

In the following Examples the parts and percentages are intended by weight, unless otherwise specified.

EXAMPLE 1

Preparation of polymer A

To 113 parts of pure ε-caprolactam, kept at 100° C under agitation in an inert nitrogen atmosphere, there are added 0.78 parts of metallic potassium. After 10 minutes the metal-lactam formation is completed, and 140 parts of dimethylsulphoxide are added to the mixture. 3.10 parts of N-acetylcaprolactam are then added to the mixture, and the temperature is raised to 155° C. The mixture is kept under these conditions for a period of 2 hours.

Finally it is allowed to cool to ambient temperature and at the same time 700 parts of anhydrous toluene are added. The polymer A precipitates in a very fine and dispersed form.

The suspension is filtered and thoroughly washed with anhydrous toluene, operating so as to prevent any contact with moisture or air, until the reaction solvent is completely removed.

for 15 minutes longer and then filtered.

The A-B copolymer is dried in a vacuum oven at 60° C and then thoroughly washed with hexamethylphosphoric triamide at 60°–70° C. The A-B copolymer, after further washing with acetone, is again dried and analysed:

Total yield: 93.8%
Block A % = 1.26 [ultimate analysis: N=0.156%]
Intrinsic viscosity: 4.56

In the following, the A-B copolymer viscosity will be always measured at 60° C from a solution of p-chlorophenol with 2 wt.% of α-pinene containing 0.5 wt.% of copolymer and expressed as the ratio $$\eta \text{ intrinsic} = \frac{\eta \text{ relative}}{\text{concentration}} \text{ in liters.g}^{-1}.$$

The analysis of the infra-red spectrum shows the presence of the band of the group —CH$_2$OH at 3460 cm$^{-1}$, of the band of the group —NH at 3310 cm$^{-1}$, of those of the lactamic CO at 1640 cm$^{-1}$ with an absorption also at 1660–1670 cm$^{-1}$. There are also present bands at 4425 cm$^{-1}$ and at 2020 cm$^{-1}$ related to the oxymethylene chain.

Stabilization of the A-B copolymer 100 parts of A-B copolymers were esterified under inert conditions in a reactor fitted with a stirrer with a mixture of 100 parts of acetic anhydride, free of acetic acid, and 200 parts of n-dodecane. The suspension was kept in agitation for 20 minutes at 150° C, the pressure of the reactor being adjusted so as to keep the system boiling.

The stabilized A-B polymer was filtered, then thoroughly washed with toluene and then with acetone. Drying was carried out in an oven at 60° C in a vacuum, the stabilized copolymer being recovered with a yield of 97.8% and analyzed.

The analytical data of the stabilized A-B copolymer do not differ appreciably from those obtained before stabilization as far as the intrinsic viscosity and the block A content are concerned.

Analysis of the infra-red spectrum:

Compared with the analysis of the product before stabilization, there are noted in the spectrum the disappearance of the band relating to the —CH$_2$OH group and the appearance at 1750 cm$^{-1}$ of the band relating to the ester (acetyl) group.

Thermal degradation test ($K_{220}$) = 0.008%.

$K_{220}$ is the weight loss percentage per minute during the first 30 minutes at 220° C in a nitrogen atmosphere, measured by thermo-scale.

EXAMPLE 2

Preparation of the A-B copolymer

The polymer A prepared in the first part of Example 1 is charged in an amount of 16 parts in the formaldehyde polymerization reactor containing 1000 parts of toluene, operating under controlled conditions ensuring the complete absence of air and moisture.

The stirring is started and pure gaseous formaldehyde monomer is introduced at a rate of 2.5 parts per minute. The monomer is fed continuously into the reactor for a period of 95 minutes, keeping the temperature of the system at about 20° C by means of a water bath.

Finally the flow of formaldehyde is switched and the slurry of the resulting A-B copolymer is kept for 15 minutes more under stirring and then filtered.

Operating in a similar way to that described in Example 1 the A-B copolymer produced is purified and analyzed.

Total yield: 94.5%
Block A % = 6.36 (Ultimate analysis: nitrogen % = 0.789)
Intrinsic viscosity: 3.22
Infra-red spectrum analysis The spectrum is similar to that obtained in Example 1.

Stabilization of the A-B copolymer

A fraction of the A-B copolymer was esterified with the same reagents and conditions as in Example 1, with a yeild of 98.0%.

The analytical data of the stabilized A-B copolymer do not show appreciable variations of the intrinsic viscosity and the content of block A.

Infra-red spectrum analysis: as in Example 1.
Thermal degradation test: $K_{220}$ = 0.004%.

EXAMPLE 3

Operating according to the synthesis and esterification procedure of Example 1, a copolymer was produced containing a higher percentage of block A.

The copolymer was subjected to accurate extraction with hexamethylphosphoric triamide at 70°–75° C in inert conditions.

The solvent obtained was cooled and diluted with petroleum ether up to a ratio of 1:1. After storage for 20 hours at 0° C the solution was still limpid. The remaining A-B copolymer was thoroughly washed with acetone and then dried in a vacuum oven at 60° C.

Overall yield: 85.6% (polymerization-esterification-extraction)
% of block A = 15.8 (Ultimate analysis: nitrogen % = 1.956)
Intrinsic viscosity: 2.69
Thermal degradation test — $K_{220}$: 0.005%
The polymer was admixed with 0.3% of 2,2'-methylenebis-(4-methyl-tert-butylphenol) and the resulting blend was subjected to physical and mechanical tests:

| | |
|---|---|
| Density (g/ml) | = 1.35 |
| Impact strength Izod with notch (Kg.cm/sq.cm) (ASTM - D256) | = 18 |
| Tensile strength (kg/sq.cm) (ASTM - D638) | = 720 |
| Elongation (%) (ASTM - D638) | = 100 |
| Flammability (mm/min.) (ASTM - D635) | = 18 |

As a comparative test 900 g of hexamethylphosphoric triamide, 16 g of polycaprolactam prepared in the first part of Example 1 (dried separately) and 84 g of polyoxymethylene diacetate are placed in a 2000 ml flask, operating under inert conditions and under agitation. The said polyoxymethylene, produced by the polymerization of anhydrous formaldehyde in the presence of an anionic initiator and then esterified with acetic anhydride, has an intrinsic viscosity of 2.72.

The mixture is heated under stirring and when the temperature is about 60° C the polyamide starts to dissolve whilst the formaldehyde polymer remain in suspension (dissolution temperature of this polymer > 130° C).

Operating at 70°–75° C, the suspension is suitably filtered and the solid remaining is thoroughly washed, still at the same temperature, with hexamethylphosphoric triamide.

A precipitate is recovered from the solvent (mother and washing liquors) by cooling at 15° C and the addition of petroleum ether. The product is filtered and after thorough washing with petroleum ether it is oven dried at 60° C.

15.97 g of product are thus recovered, which when subjected to ultimate analysis is shown to be polycaprolactam (nitrogen %: 12.37).

The solid remaining undissolved after extraction with hexamethylphosphoric triamide is thoroughly washed with acetone and then dried in a vacuum oven at 60° C. 83.92 g of product are thus recovered which, when subjected to ultimate analysis was shown to be, essentially, polyformaldehyde (%C = 40.01, %H = 6.66, %N < 0.01).

EXAMPLE 4

Preparation of polymer A

To 113 parts of pure ε-caprolactam kept at 100° under stirring with a propeller screw agitator and in an inert atmosphere, there are added 0.229 parts of metallic sodium. The metal-lactam formation is rapid and after 15 minutes there are added 170 parts of anhydrous cumene and 1.30 parts of iso-amyl acetate. The temperature is gradually increased so as to keep the system under reflux at atmospheric pressure, and in a period of two hours 77 parts of distillate are taken off. The polymer suspension which has formed is kept at 150° C for a total period of 3 hours. Finally it is cooled and the polymer A is filtered at 80° C and thoroughly washed with anhydrous toluene so as to remove the reaction liquid completely. Analysis of the polymer A shows the following results:

Conversion: 80.1%
Reduced viscosity = 1.32
Particle size:
 > 88 microns = 0.8%
 88–44 microns = 62.3%
 > 44 microns = 36.9%

Preparation of the A-B copolymer 180 parts of the polymer A are charged in a formaldehyde polymerization reactor containing 1000 parts of n-heptane. Operating under strictly anhydrous conditions and under agitation, pure gaseous monomeric formaldehyde is introduced at a rate of 2.5 parts per minute. The monomer is fed into the reactor continuously for a period of 28 minutes, the temperature being kept at about 0° C by cooling with brine.

Finally the flow of formaldehyde is switched and the A-B copolymer slurry which has formed is kept for 15 minutes longer in agitation, then filtered and dried in a vacuum oven at 50° C.

The A-B copolymer which is produced is stabilized by reaction with acetic anhydride according to the procedure already indicated in Example 1. The reaction temperature is kept at 145°–150° C for a period of 20 minutes. Finally the stabilized A-B copolymer is discharged, thoroughly washed with toluene, and dried.

The stabilized A-B copolymer is then subjected to washing-extraction with hexamethylphosphoric triamide at 70°–75° C. After a further washing with toluene, and drying, it is analyzed.

Total yield: 80.3%
Intrinsic viscosity: 1.40
Block A % = 70.3 (Ultimate analysis: % Nitrogen = 8.71)
Thermal degradation test: $K_{220}$ = 0.008%
NMR analysis: a solution of 20% of stabilized A-B copolymer in deuterated dimethyl sulphoxide was formed at 140° C.

Analysis of the spectrum showed the presence of the polymeric blocks recognizable by the chemical-shifts of the different protonic groups of the amide and formaldehyde part. Quantitative evaluation confirms the data of the ultimate analysis.

EXAMPLE 5

The synthesis, the stabilization and the purification of the A-B polymer are carried out in the same way as in Example 4, and a new A-B block copolymer was prepared, The A polymer is that produced in the first part of Example 4.

Block A (%) = 95.4 (ultimate analysis. Nitrogen % = 11.88)
Intrinsic viscosity = 1.23
Pyrolitic gas-chromatography In the pyrolysis gases (about 530° C) ε-caprolactam, trioxan and tetroxan (formed by cyclization of formaldehyde under the analysis conditions) were identified. The formaldehyde does not appear in the chromatogram. The quantity of ε-caprolactam accords with that obtained by ultimate analysis.

| - Mechanical properties | |
|---|---|
| Density (g/ml) | = 1.18 |
| Impact strength Izod with notch (Kg.cm/sq.cm) (ASTM-D256) | = 18 |
| Tensile strength (Kg/sq.cm) (ASTM-D638) | = 740 |
| Elongation (%) (ASTM - D638) | = 180 |
| Coefficient of linear expansion (m/m.$10^{-5}$, ° C) | = 9.6 |
| Moisture absorpton (%) | = 1.25 |

EXAMPLE 6

Preparation of the polymer A

To 85 parts of pure α-pyrrolidone, 0.69 parts of finely subdivided metallic sodium are added, under agitation in inert conditions at 60°. Upon completion of the metal-lactam formation, 100 parts of anhydrous dimethylformamide and 3.81 parts of N-acetyl-pyrrolidone are introduced into the reactor. The temperature is brought to 10° C and the reaction medium is kept in agitation for a period of 35 hours.

Finally the suspension which has formed is diluted and then thoroughly washed with anhydrous toluene so as to eliminate the soluble polymerization residues.

Analysis of the polymer A shows the following results:

| - Conversion: | | 83.3% |
|---|---|---|
| -Reduced viscosity: | | 1.05 |
| -Melting point: | | 262–265° C |
| -Grain size | 88 microns | = 1.2% |
| | 88–44 microns | = 85.4% |
| | 44 microns | = 13.4% |

Preparation of the A-B copolymer

Operating in a manner similar to that described in Example 1; there is introduced into the polymerization reactor containing 1000 parts of cyclohexane and 68 parts of polymer A prepared as above, a flow of pure gaseous monomeric formaldehyde, at the rate of 2.5 parts per minute for a period of 135 minutes. In the reactor the temperature is kept at about 35° C by means of a water bath. Polymerization occurs very rapidly and completely.

The flow of formaldehyde is then switched and the resulting A-B copolymer slurry is kept for 15 minutes longer under agitation and is then filtered. After oven drying at 60° C, the A - B copolymer is esterified by means of acetic anhydride in the reaction medium indicated in Example 1. The reaction temperature is kept at 140°–142° C for a period of 20 minutes. Finally the stabilized A - B copolymer is discharged, thoroughly washed with toluene and dried.

The stabilized A - B copolymer is then subjected to washing - extraction with m-cresol at 30°–40° C. After another washing with acetone it is then analysed.

Total yield: 75.4%
Intrinsic viscosity: 1.59
Block A (%): 15.0 (ultimate analysis: Nitrogen(%)= 2.47)
Thermal degradation test: $K_{220} = 0.01\%$
NMR analysis: The copolymer is dissolved up to a 20% concentration in deuterated dimethylacetamide at 138° C.

Analysis of the spectrum shows the presence of polymeric blocks recognizable from the chemical-shifts of the various protonic groups of the amide and formaldehyde part. Quantitative analysis confirms the data of the ultimate analysis.

EXAMPLE 7

Preparation of the polymer A

To 85 parts of α-pyrrolidone there are added, under conditions kept strictly inert by means of a nitrogen flow, 3.32 parts of tetramethylammonium pyrrolidone and 2.54 parts of N-acetyl-pyrrolidone. The mixture is kept at 25° C for 40 hours. Finally the resulting polymer A is finely milled under inert conditions and then subjected to thorough washing with benzene at 50° C. Analysis of the polymer A shows the following results:

Conversion: 78.8%
Reduced viscosity: 0.84
Grain size
  < 88 microns = 0.65%
  88–44 microns = 68.45%
  > 44 microns = 30.9%

Preparation of the A - B copolymer

Operating in a similar manner to that described in Example 1; there is introduced into the polymerization reactor containing 1000 parts of cyclohexane and 9 parts of polymer A prepared above, a flow of pure, gaseous, monomeric formaldehyde, at a rate of 2.5 parts per minute for a period of 117 minutes. The temperature is kept at 10° C by means of a circulation of water at 0° C.

The flow of formaldehyde is then switched and the slurry of A - B copolymer is kept in agitation for another 15 minutes and then filtered. After drying at 60° C in a vacuum oven, the A - B copolymer is thoroughly washed with m-cresol at 40°–50° C and then with acetone and finally analyzed.

Total yield: 92.5%
Block A % = 2.81 (ultimate analysis: Nitrogen % = 0.462)
Intrinsic viscosity = 1.90

Stabilization of the A - B copolymer

A portion of A-B copolymer was esterified by means of acetic anhydride with the reactive system already indicated in Example 1, the reaction being carried out under the same operative conditions. The yield is of 96.8%.

Analytical data of the stabilized A-B copolymer:

Intrinsic viscosity: 1.88
Block A % = 2.88 (ultimate analysis: Nitrogen % = 0.475)
Thermal degradation test: $K_{220} = 0.01\%$
The polymer is admixed with 0.2% of 4,4-butylidene-bis-(6-tert-butyl-m-cresol) and the resulting blend is subjected to the following physical-mechanical characterizations:

| | |
|---|---|
| Density (g/ml) | = 1.433 |
| Impact strength Izod with notch (Kg.cm/sq.cm) (ASTM - D 256) | = 15 |
| Tensile strength (Kg/sq.cm) (ASTM - D 638) | = 715 |
| Elongation (%) (ASTM - D 638) | = 80 |
| Flammability (mm/minute) (ASTM - D 635) | = 22.7 |

EXAMPLE 8

Preparation of the polymer A

To 197 parts of ω — lauryllactam there are added at 180° C under agitation in an inert atmosphere 0.21 parts of lithium and after 30 minutes 7.17 parts of N-acetyl-lauryllactam. The mixture is brought to a temperature of 230° in a period of 10 minutes, and left in these conditions for 40 minutes. Next, 800 parts of pre-heated anhydrous dimethyl sulphoxide are slowly added to the molten polymer A.

Thus a heat stable solution is produced from which the polymer A is precipitated as an extremely dispersed powder by gradual cooling. The suspension is thoroughly washed with anhydrous benzene so as to eliminate all soluble residue. Analysis of the polymer shows the following results:

conversion = 88.4%
Reduced viscosity = 0.88
Melting point: 179°–183° C
Grain size:
  > 88 microns = 1.5%
  88–44 microns = 44.5%
  > 44 microns = 46.0%

Preparation of the A-B copolymer

Operating in a manner similar to that described in Example 1 a flow of pure gaseous monomeric formaldehyde is introduced into the polymerization reactor containing 1000 parts of benzene and 20 parts of polymer A prepared above, at a rate of 2.5 parts per minute for a period of 140 minutes. The temperature is kept at 20° C by means of cold water circulation.

Finally the flow is switched and the slurry of A-B copolymer is still kept in agitation and then filtered. After drying at 60° C in vacuum oven the A-B copolymer is thermally stabilized by esterification with acetic anhydride in a reactive system identical with that of Example 1. The reaction temperature is kept at 150°–152° C for 20 minutes. The stabilized A-B copolymer, after filtering, washing with toluene and drying again, was subjected to a further washing - extraction with hexamethylphosphoric triamide at 80°–85° C. The product remaining after rewashing in toluene was examined.

Total yield: 95.1%
Block A (%) = 5.44 (ultimate analysis: Nitrogen (%) = 0.386)
Intrinsic viscosity = 3.81
Degradation test: $K_{220} = 0.01\%$
Infra-red spectrum analysis:

The spectrum shows the presence of the band of the acetyl ester group at 1750 cm$^{-1}$, the band of the NH group, and of that of the lactamic C = O group at 1640 cm$^{-1}$ with an accentuated absorption at 1660–1670 cm$^{-1}$. The bands of the oxymethylene chain are also present at 4425 cm$^{-1}$ and at 2020 cm$^{-1}$.

As a comparative test, 900 g of hexamethylphosphoric triamide, 6 g of polylauryllactam (prepared before hand and dried) and 94 g of polyoxymethylene diacetate were placed in a 2000 ml flask in inert conditions and under agitation. The formaldehyde polymer, produced by polymerization of the anhydrous formaldehyde in the presence of an anionic initiator and then esterified with acetic anhydride, has an intrinsic viscosity of 3.22. The mixture is heated under agitation and when the temperature reaches 80° C the polyamide begins to dissolve, whilst the polyoxymethylene remains in suspension (dissolving temperature of this polymer < 130° C). The suspension is suitably filtered at 80°–85° C and the remaining solid is thoroughly washed, still at the same temperature.

From the solvent (mother and washing liquors) there is recovered, by cooling to 30° C a precipitate which after filtering and further washing with acetone, is dried in vacuum oven at 60° C. 5.94 g of product are thus recovered, which subjected to ultimate analysis is shown to be polylauryllactam (Nitrogen (%) = 7.10).

The solid remaining undissolved after extraction with the hot solvent was thoroughly washed with acetone and then vacuum dried at 60° C. 93.9 g of product were thus recovered, which when subjected to ultimate analysis is shown to be essentially polyformaldehyde (%C = 40.000; %H = 6.66; % N = 0.01).

EXAMPLE 9

Operating in a manner similar to that described in Example 8, and with the same polymer A, an A-B copolymer is prepared having the following characteristics:

Block A (%) = 84.5 (ultimate analysis: Nitrogen (%) = 6.00)
Intrinsic viscosity: 1.16
Pyrrolytic gas - chromatography.

In the pyrolysis gases (about 530° C) ω-lauryllactam, trioxan and tetraoxan (formed by cyclisation of formaldehyde under operative conditions) were identified, formaldehyde was not detected, the quantity of lauryllactam calculated by the chromatogram corresponds well with the value deduced from the ultimate analysis.

We claim

1. A block copolymer of the structure A-B wherein:
A is a polylactamic block consisting of a chain of recurring units:

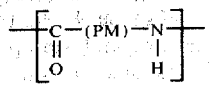

obtainable from one or more monomeric lactams of the formula

wherein PM is a linear polymethylene chain having from 3 to 13 carbon atoms, non substituted or having at least one hydrogen atom replaced by a radical selected in the group consisting of the alkyl, aryl, alkylaryl and cycloalkyl radicals,
B is a polyoxymethylene block consisting of recurring units, said block B being present in the copolymer in an amount of at least 2% by weight, and said block A being present in the copolymer in an amount of at least 0.05% by weight.

2. The block copolymer of claim 1, wherein said block A has a molecular weight of from 1,000 to 50,000.

3. The block copolymer of claim 1 said lactams are selected in the group consisting of α-pyrrolidone, α-piperidone, ε-caprolactam, ω-enantiolactam and ω-lauryllactam.

4. A process for preparing the block copolymer of claim 1, which comprises:
preparing a polymer A by catalytic polymerization of one or more of said lactam monomers in a first polymerization stage;
purifying the resulting polymer A to render it suitable for the subsequent reaction with formaldehyde;
preparing the A-B block copolymer in a second polymerization stage by reacting monomeric formaldehyde with said polymer A.

5. The process of claim 4, wherein said first polymerization stage is carried out in the presence of an anionic catalyst consisting of a derivative of one of said lactams of the formula:

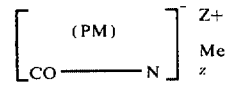

wherein PM is the said polymethylene chain, Z is 1 or 2 and Me is selected in the group consisting of alkali metals, alkaline earth metals and quaternary ammonium groups.

6. The process of claim 5, wherein said catalyst is used in an amount of from 0.1 to 10 moles for each 100 moles of starting lactam monomers.

7. The process of claim 4 wherein said first polymerization stage is carried out at a temperature of from −30° to 300° C and for a period of from 1 minute to 120 hours.

8. The process of claim 4 wherein said first polymerization stage is carried out in the presence of a promotor selected in the group consisting of N-acyl lactams, acid chlorides, N-substituted imides, esters of organic acids and isocyanates, said promotor being added in an amount of from 0.1 to 10 moles for each 100 moles of starting lactam monomers.

9. The process of claim 4, wherein said polymer A is brought to a particulate form during said purification.

10. The process of claim 4 wherein said monomeric formaldehyde is reacted with said purified A-B copolymer, either dissolved in a solvent or suspended in a diluent, at a temperature of from −70° C to 110° C.

11. The process of claim 4 wherein said second polymerization stage is carried out at a temperature of from −20° to 80° C.

12. The process of claim 4 wherein said A-B copolymer is stabilized by converting the terminal hydroxyl group of the block B into a group selected in the class consisting of the ester, ether and urethane groups.

* * * * *